United States Patent [19]

Wiers

[11] Patent Number: 4,592,591

[45] Date of Patent: * Jun. 3, 1986

[54] HOUSING FOR SEAT ADJUSTER LOCKING MECHANISM

[75] Inventor: John W. Wiers, Romeo, Mich.

[73] Assignee: Rockwell International Corporation, Pittsburgh, Pa.

[*] Notice: The portion of the term of this patent subsequent to Nov. 12, 2002 has been disclaimed.

[21] Appl. No.: 539,436

[22] Filed: Oct. 6, 1983

[51] Int. Cl.⁴ .............................................. A47C 1/027
[52] U.S. Cl. ..................................... 297/375; 74/531; 188/67
[58] Field of Search ............... 297/374, 375, 353, 354, 297/355; 74/531; 188/67; 248/410; 29/453, 463

[56] References Cited

U.S. PATENT DOCUMENTS

| | | | |
|---|---|---|---|
| 176,835 | 5/1876 | Carson | 29/463 |
| 1,650,233 | 11/1927 | Plunkett | 29/463 |
| 3,236,002 | 2/1966 | Cunningham et al. | 29/453 |
| 3,420,032 | 1/1969 | Felt | 29/453 |
| 3,760,480 | 9/1973 | Tupker | 29/463 |
| 4,366,344 | 12/1982 | Sheehan | 29/453 |
| 4,387,926 | 6/1983 | VanEerden et al. | 297/375 |

*Primary Examiner*—William E. Lyddane
*Assistant Examiner*—Mark W. Binder

[57] ABSTRACT

A housing for the operative elements of a locking mechanism in a seat adjusting device of the type which includes a rod slidably received within a plurality of lockwashers canted about a fulcrum into locking engagement with the rod. A two-part self securing plastic housing is provided. Each part of the housing provides a cavity enclosing about one-half of the locking mechanism with the rod extending through circular apertures formed by semi-circular bosses at each end of each housing member.

12 Claims, 12 Drawing Figures

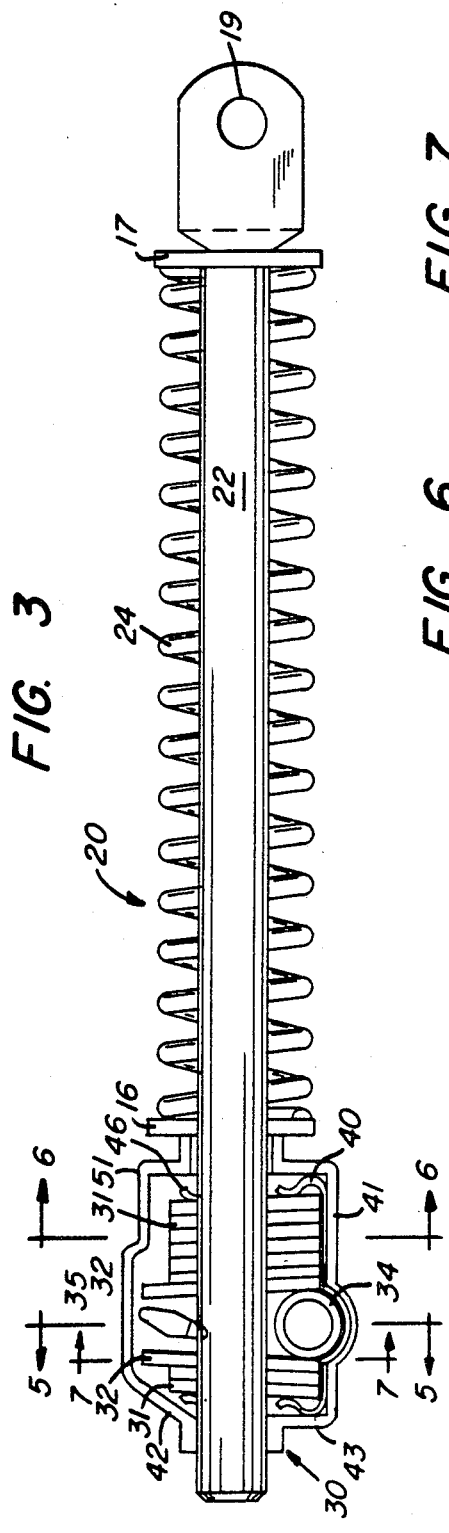
FIG. 3
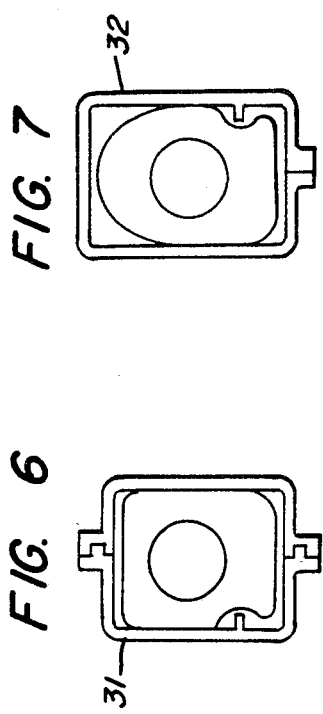
FIG. 7
FIG. 6
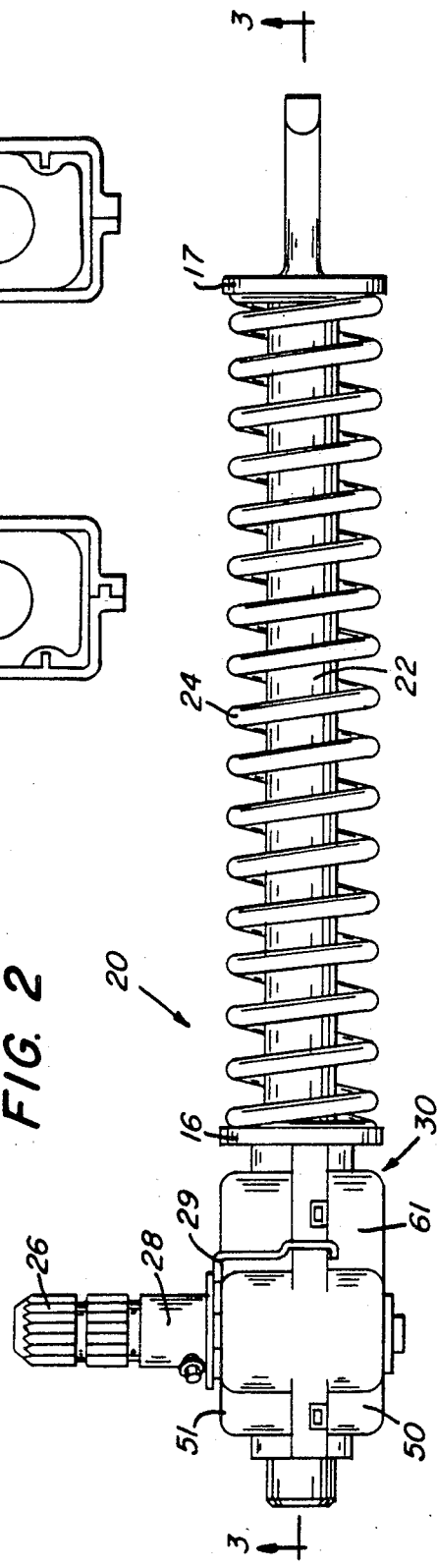
FIG. 2

HOUSING FOR SEAT ADJUSTER LOCKING MECHANISM

BACKGROUND OF THE INVENTION

1. Field of the Invention

The present invention relates to a seat adjusting device and more specifically, to a housing for the operative elements of a locking mechanism in an automotive vehicle seat adjusting device of the type which includes a rod pivotally attached to the seat back and slidable for selective positioning within a locking mechanism fixed to the seat.

2. Description of the Prior Art

A seat adjusting devices of the type which the present invention is directed to generally include a shaft or rod slidably received within a locking mechanism which includes a plurality of lockwashers slidably mounted on the rod, a fulcrum and a spring or other means biasing the lockwashers about the fulcrum to engage the edge of the lockwasher apertures with the surface of the rod and thereby hold or "lock" the rod in that position relative to the locking mechanism and the seat to which it is fixed. A manually actuable release mechanism, is usually associated with the locking mechanism to move the lockwashers against the spring or other biasing force and thereby selectively position the rod and seat back relative to the locking mechanism and seat at which point the release mechanism is deactuated thereby permitting the spring or other biasing means to cant the lockwashers into engagement with the rod and thereby hold the selected position. The release mechanism is frequently provided in the form of a rotary or pivoting cam actuated by means of a crank lever or a handle.

Automotive vehicle seat adusting devices of the type to which the present invention is directed are disclosed in U.S. Pat. Nos. 3,271,071 and 4,387,926. Those patents disclose a seat adjusting device comprising a rod slidably received by a locking mechanism enclosed within a stamped or tubular metal housing. Those seat adjusting devices are secured for pivotal movement relative to the seat elements by means of an aperture provided at one end of a rod and an aperture provided to the metal housing at the opposite end of the seat adjusting device. With such an arrangement, the forces developed between the lockwashers and the rod internally of the locking mechanism must be absorbed by the housing or transmitted by the housing through the element pivotally fixing the apertured end of the housing to one of the seat elements. Those seat adjusting devices also utilize coil springs internally of the housing to bias the lockwashers into engagement with the rod. The coil springs require a seat or other means opposite the lockwashers and guiding means such as the rod or other projections provided internally of the locking mechanism housing which constitute additional elements and require a more tedious and complex assembly of the seat adjusting device.

SUMMARY OF THE INVENTION

The present invention provides a housing for the operative elements of seat adjusting device of the type which includes a rod secured for adjustment of one part of the seat and axially movable relative to a locking mechanism fixed to another part of the seat for selective locking engagement at different positions on the rod. The housing is comprised of two members each of which is formed to provide one wall and a plurality of other walls normal to that wall and defining a cavity complimentary to a portion of the shape of the locking mechanism and an inner peripheral edge. The inner peripheral edges are substantially mirror images and two of the other walls of each member have aligned recesses. The two members are secured together with their respective inner peripheral edges in abutment to enclose the operative elements of the locking mechanism with the rod extending through axially aligned openings provided by the recesses.

In the preferred embodiment semi-ciruclar recesses are provided in the walls of each member and a plurality of slots and detents are integrally formed in the members with each detent positioned to engage a corresponding slot in the other member and thereby secure the housing members together.

In the preferred embodiment, apertures are provided in the major wall of each member. Each aperture is positioned to be axially aligned with a corresponding aperture in the other member and provide axially spaced circular seats when the housing members are secured together.

DESCRIPTION OF THE DRAWINGS

In the drawings, when like reference numerals refer to like parts:

FIG. 2 is a plan view of the seat adjusting device shown in FIG. 1;

FIG. 3 is a sectional view taken along the line 3—3 of FIG. 2;

FIG. 6 is a sectional view taken along line 6—6 of FIG. 3;

FIG. 7 is a sectional view taken along line 7—7 of FIG. 3;

DESCRIPTION OF THE INVENTION

Figure 1:
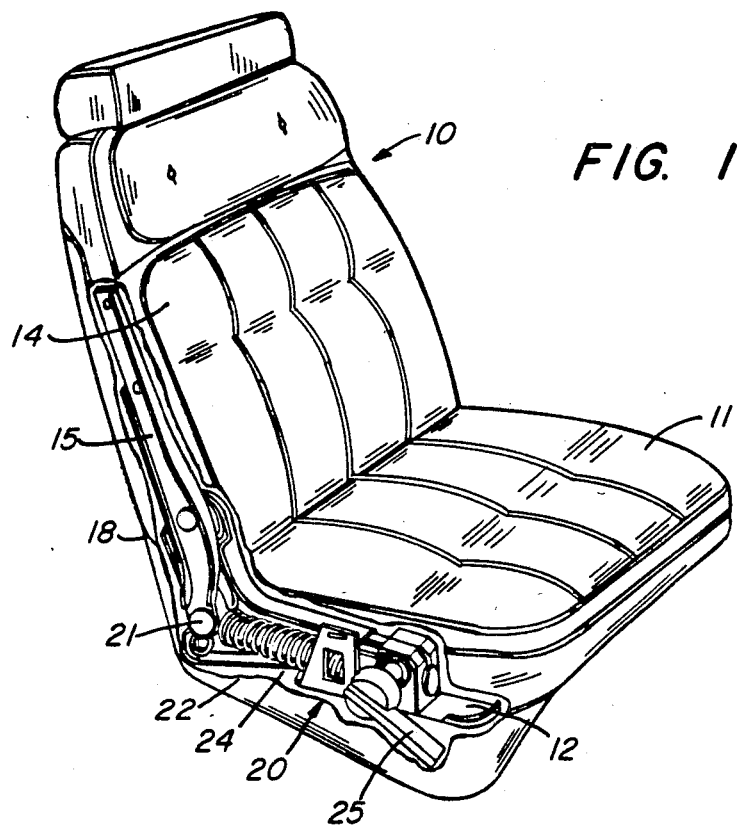
FIG. 1 is a perspective view of an automotive vehicle seat which includes the seat adjusting device of the present invention.
Figure 4:
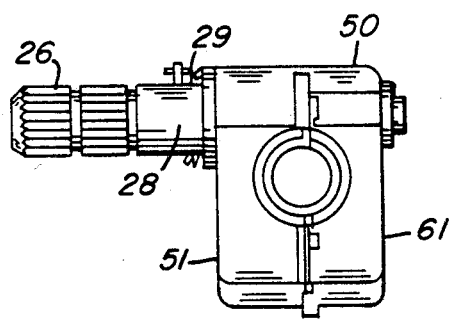
FIG. 4 is a front elevation view of the seat adjusting device shown in FIG. 1.

With reference to the drawings, FIG. 1 shows an automotive vehicle seat 10 comprised of a seat portion 11 supported by a frame a portion of the which is shown at 12 and a seat back 14 supported by a pair of side back frames one of which is shown at 15. A seat adjusting device 20 includes a locking mechanism secured to the seat frame 12 and a rod 22 slidably received within the locking mechanism is pivotally secured by means of a pin 21 at the lower end of the seat back frame 15. A seat return coil spring 24 is provided between the side frame 15 and the locking mechanism to bias the side frame 15 and seat back 14 to the upright position. A manually actuated lever 25 is provided to release the locking mechanism threby permitting an occupant of the seat 10 to adjust the seat back 14 to a comfortable position by moving the lever 25 to release the locking mechanism and moving the seat back 14 which in turn will move the side frame and rod 22 relative to the locking mechanism at which time the occupant will release the lever 25 thereby locking the rod 22 and seat back 14 in that selected position.

With reference to FIGS. 2 and 3 the lever 25 is seated on the splined end 26 of a shaft 28 rotatably mounted to the locking mechanism generally indicated by the reference numeral 30. A return spring 29 is seated at one end on the locking mechanism 30 and at the other end on a pin carried by the shaft 28 to return the lever 25 and shaft 28 to its inoperative position upon release. The seat return spring 24 coxially with rod 22 is seated at its opposite ends against washers 16 and 17. The washer 16 bears against the housing of locking mechanism 30 to move the rod 22 to its fully extended position as shown in FIGS. 1–3. The end of the rod adjacent washer 17 is provided with an aperture 19 for receiving the pin 21 which pivotally connects the rod 22 to the lower end of the seat back frame 15 which in turn is pivoted for rocking movement about a pin 18.

The locking mechanism includes a plurality of lockwashers 31 and 32, a fulcrum in the form of a hollow steel tube 34, a formed spring 40 and a cam 35 enclosed within a housing 50.

The lockwasher 31 and 32 are apertured with the diameter of the aperture being slightly larger than the diameter of the rod 22 so as to enable the washers to be tilted or canted about the fulcrum tube 32 with an edge of each aperture engaging the surface of the rod 22 with the net effect of the edges of the apertures of all of the lockwashers 31 and 32 preventing relative movement between the rod 22 and the assembly of lockwashers 31 and 32.

Figure 12:
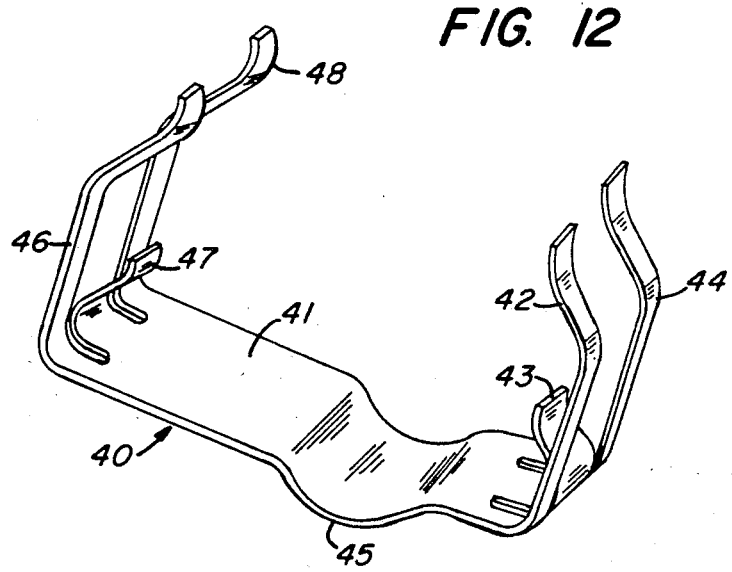
FIG. 12 is a perspective view of the lockwasher biasing spring.

The lockwashers are tilted or canted into engagement with rod 22 by the spring 40 which, as shown by FIGS. 3 and 12 is a formed spring of generally "C" or channel shape having a web portion 41 and a plurality of legs 42–44 and 46–48 at each end of the web. The web 41 is of sufficient width to extend across the combined thickness of the lockwashers 31 and 32 and is formed with a cylindrical depression 45 which is seated across the bottom of the tubular fulcrum 34 as shown by FIG. 3. The legs 42, 44 and 46, 48 are spaced so they may extend parallel to the opposite side walls of the housing 50, one on each side of the rod 22 where the legs 42, 44, 46 and 48 contact the lockwashers 31 which are most distant from the fulcrum 44 and cant those, as well as the intermediate lockwashers, into engagement with the rod 22. The spring leg 43 located between the legs 42 and 44 and the spring leg 47 located between the legs 46 and 48, although not as long as the legs 42, 44, 46 and 48 are nevertheless of sufficient length to extend beyond the axis of the tubular fulcrum 34 and add additional biasing force to urge the lockwashers about the fulcrum 34.

In addition to the locking operation provided by the biasing force of the spring 40, the spring 40 also maintains the stack of lockwashers 31 and 32, the tubular fulcrum 34 and itself as a unit subassembly on the rod 22 during assembly of the seat adjusting device 20.

Figure 5:
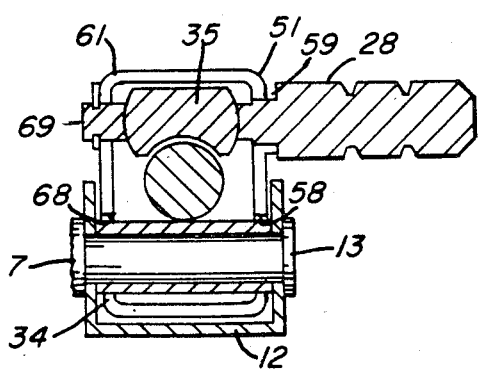
FIG. 5 is a sectional view taken on the line 5—5 of FIG. 3

The cam 35 is integrally formed as part of the shaft 28, see FIG. 5, which is seated for rotation in axially aligned apertures 59 and 69 provided through the locking mechanism housing 50.

The lockwashers 31, 32 are elongate and substantially rectangular in form. As shown by FIGS. 6 and 7, the vertical dimension is greater than the width of the lockwashers 31, 32 and this facilitates a very compact locking mechanism that fits snugly upon the seat frame 12 at the side of the seat. The number and specific arrangement of the lockwashers required depends upon each particular application. In the preferred embodiment, two control lockwashers 32 are provided as the innermost lockwashers immediately adjacent the fulcrum 34. As shown by FIGS. 3, 6 and 7, the control lockwashers 32 are of greater length at the top of the locking mechanism 32 than are the lockwashers 31 to present a slightly larger area facing the rotary cam 35.

Figure 8:
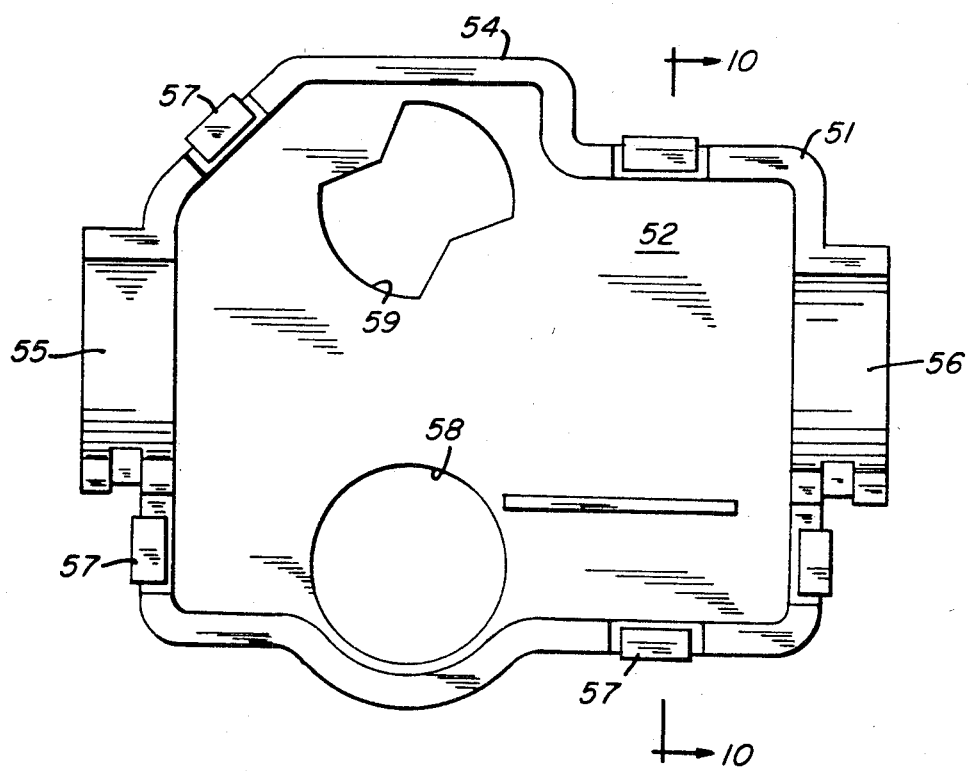
FIG. 8 is a side elevation view of one member of the locking mechanism housing.
Figure 10:
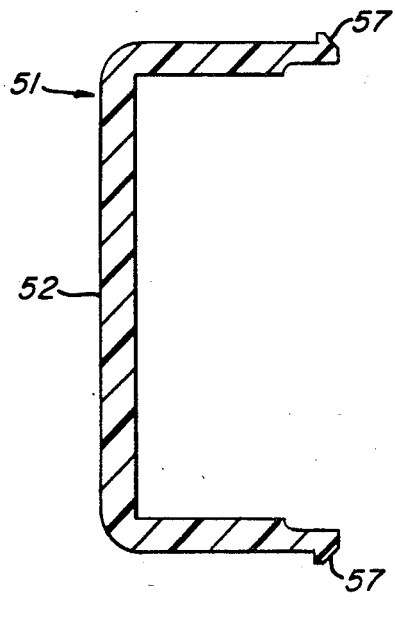
FIG. 10 is a sectional view taken on line 10—10 of FIG. 8.

The locking mechanism housing 50 is a two-part housing formed by the combination of a first housing member 51 and a second housing member 61. As shown by FIGS. 8 and 10, the first housing member 51 is formed to provide a major side wall 52 and a plurality of other walls normal to the side wall 52 and defining a cavity complementary to the shape of about half of the locking mechanism per se. The edges of the walls normal to the major side wall 52 provide an inner peripheral edge surface 54. The front and the rear end walls of the housing 52 are formed to provide axially aligned semi-circular recesses or bosses 55 and 56. A pair of apertures 58 and 59 are also provided through the side wall 52 of the housing member 51.

The inner peripheral edge 54 of the housing member 51 is interrupted at several locations by the provision of a hook or detent 57, five of which are shown formed integrally with the first housing member 51.

Figure 9:
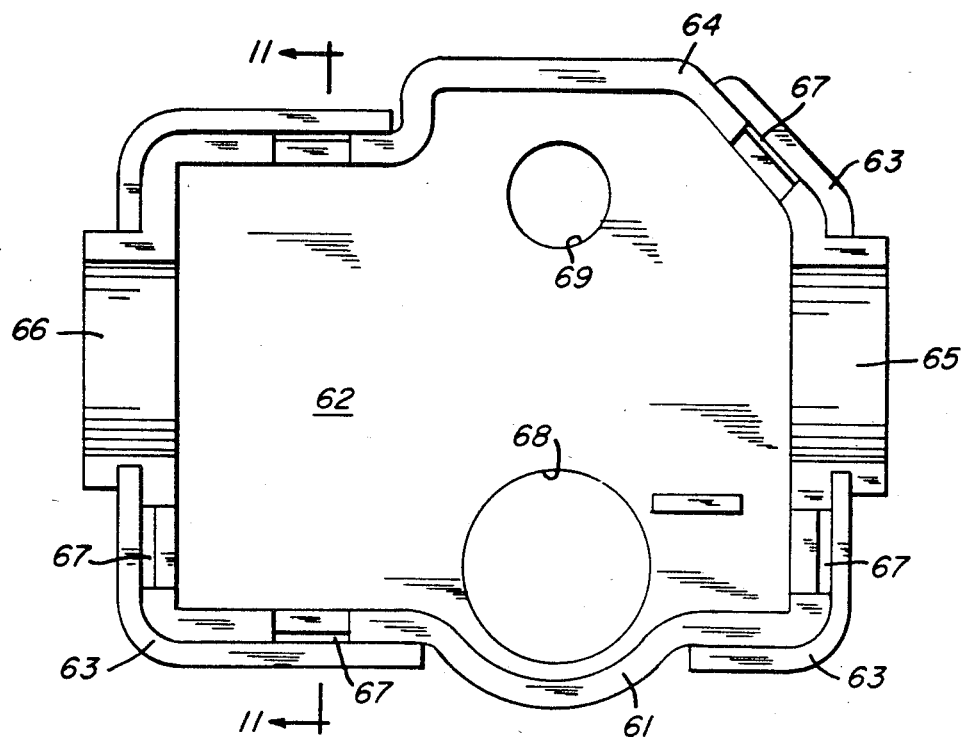
FIG. 9 is a side elevation view of the other member of the locking mechanism housing.
Figure 11:
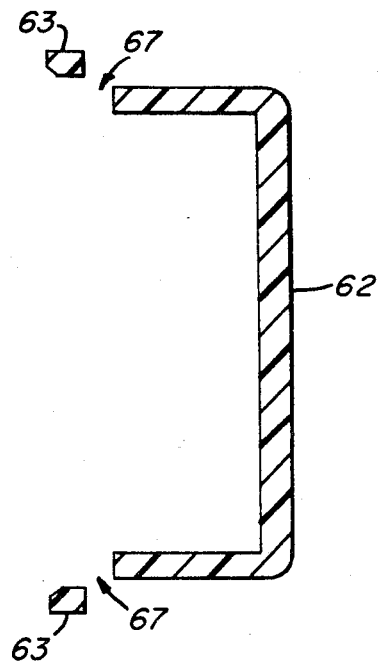
FIG. 11 is a sectional view taken on line 11—11 of FIG. 9.

As shown by FIGS. 9 and 11, the second housing member 61 is formed to provide another major side wall 62 and a plurality of other walls normal to the side wall 62 and defining a cavity complementary to the other half of the locking mechanism. The outer edges of the walls normal to the major side wall 62 define an inner peripheral edge surface 64 which is substantially a mirror image of the shape of the inner peripheral edge 54 of the first housing member 51. A pair of axially aligned semi-circular recesses or bosses 65 and 66 are provided to the inner peripheral edge 64 of the second housing member 61.

Portions of the inner peripheral edge 64 of the housing member 61 are also flanged as shown by the reference numberal 63 and a plurality of slots 67, five of which are shown, are formed at the inter section of the flanges 63 and one of the other walls normal to the side wall 62 of the housing member 61. A pair of apertures 68 and 69 are also provided through the side wall 62 of housing member 61.

The two parts 51 and 61 of the locking mechanism housing 50 are formed to be assembled to the seat adjusting device after the lockwashers, fulcrum and spring have been assembled to the rod by placing the housing members 51 and 61 on opposite sides of the rod 22 and applying a slight manual force to secure the two housing members together. The inner peripheral edges 54 and 64 are formed as mirror images one of the other so that they may be readily placed in abutment. The flanges 63 provided about portions of the inner peripheral edge 64 of housing member 61 are formed complementary to the outer surfaces of the walls of the housing member 51 to secure the housing members 51 and 61 against lateral displacement when the inner peripheral edges 54 and 64 are placed in abutment. Each of the detents 57 of the housing member 51 are located opposite one of the slots 67 of the housing member 61 and seat against a reverse surface of the opposing slot thereby securing the housing members 51 and 61 together.

The semi-circular bosses 55 and 56 of housing member 51 are axially algined with each other and with the semi-circular bosses 65, 66 of housing member 61 to surround the rod 22 and thereby permit the rod to extend through the circular apertures provided by the combination of the semi-circular bosses 55 and 65 and 56 and 66.

The aperture 58 of housing member 51 is also aligned on an axis with the aperture 68 of housing member 61 to receive the tubular fulcrum 34.

The aperture 59 of housing member 51 is also axially aligned with the aperture 69 of housing member 61 to receive and rotatably mount axially spaced rotary bearing surfaces of the cam shaft 28.

The housing members 51 and 61 are perferably formed by injection molding a thermoplastic resin and the housing members of the preferred embodiment are injection molded using a 30 percent glass filled nylon resin marketed by Allied Chemical Corporation as Grade 8233.

The injection molded thermaplastic housing members 51 and 61 thus provide a lightweight housing for the locking mechanism which is self-securing and is slidably seated on axially spaced ends of the tubular fulcrum 34. As shown by dotted lines in FIG. 5, the locking mechanism 30 is secured to and supported by the channel shaped seat frame 12 by means of a pin slidably received through the interior of the hollow tubular fulcrum 34 and peened 7 or otherwise secured at the interior of the channel shaped seat frame 12. The forces developed interiorly of the locking mechanism 30 are thus taken at the hollow tubular steel fulcrum 34 independently of the lightweight plastic housing and the fulcrum is attached directly to the seat frame. The biasing force of the spring 40 and the releasing force of the cam 35 are concentrated directly on the hollow steel tubular fulcrum 34.

The invention may also be embodied in other specific forms within departing from the spirit or essential characteristics thereof. The foregoing description is therefore to be considered as illustrative and not restrictive the scope of the invention being defined by the appended claims.

I claim:

1. A housing for the operative elements of a seat adjusting device of the type which includes a rod secured for adjustment of one part of the seat and axially movable relative to a locking mechanism including a plurality of apertured washers with at least one washer one each side of and biased relative to an elongate fulcrum fixed to another part of the seat for selective locking engagement at different positions on said rod comprising:

first and second members with each member formed to provide one wall and a plurality of other walls normal to said one wall and defining a cavity complimentary to the shape of a portion of the locking mechanism and an inner peripheral edge, said inner peripheral edge of said first member being substantially a mirror image of the shape of the inner peripheral edge of said second member, a mounting aperture in each said wall, two of said other walls of each of said members having aligned recesses, means biasing said washers on each side of said fulcrum toward said fulcrum independently of said housing members, means securing said first and second members together with said inner peripheral edge of said first member abutting said inner peripheral edge of said second member, said first and second members enclosing said locking mechanism with said rod projecting through axially aligned openings provided by said recesses on said other walls and said mounting apertures supporting said housing on said fulcrum whereby the forces developed interiorly of said locking mechanism are transmitted by said fulcrum to said seat independently of said housing.

2. The housing defined by claim 1 including a flange adjacent spaced portions of the inner peripheral edge of at least one of said members, said flanged portion being complimentary to and receiving portions of the outer surface of the walls of the other member to prevent lateral displacement of said members when their respective inner peripheral edges are abutting each other.

3. The housing defined by claim 1 wherein said means securing said first and second members together comprise a plurality of slots and detents formed in said members with each said detent positioned to engage a corresponding slot in the other member when the inner peripheral edges of said members are placed in abutment.

4. The housing defined by claim 2 including a plurality of slots and detents formed in said housing members with each of said slots formed at the intersection of one of said flanges with one of said walls, each of said slots having a surface engageable by one of said detents.

5. The housing defined by claim 4 wherein all of said slots are formed in one of said housing members and all of said detents are formed in the other said member.

6. The housing defined by claim 1 wherein said aligned recesses of each of said members comprise axially aligned semi-circular bosses adapted to slidably receive axially spaced areas of said rod.

7. The housing defined by claim 6 wherein said one wall of each of said members is formed with a circular mounting aperture and each of said circular mounting apertures on an axis normal to the axis of said semi-circular bosses.

8. The housing defined by claim 6 wherein said one wall of each of said members is formed with a pair of apertures and each of said apertures in one member is axially aligned with one of said apertures in the other member with the axes of alignment of said one wall apertures being normal to and on opposite sides of the axis of said semi-circular bosses.

9. The housing defined by claim 1 wherein said first and second members are formed from a plastic material.

10. The housing defined by claim 1 wherein said first and second members are formed from a glass filled thermoplastic material.

11. The housing defined by claim 10 wherein said thermoplastic material is a polyamid resin.

12. A housing for a locking mechanism secured to one part of a seat for locking engagement by a plurality of apertured washers with at least one washer on each side of and biased relative to an elongate fulcrum at selective different positions on a rod secured for adjustment of another part of the seat and axially movable relative to said locking mechanism comprising:

first and second members with each member formed to provide one wall having a mounting aperture therein and a plurality of other walls normal to said one wall and defining a cavity complimentary to the shape of a portion of the locking mechanism and an inner peripheral edge surface coplanar with a plane passing through the longitudinal axis of said rod, said inner peripheral edge of said first member being a mirror image of the shape of the inner peripheral edges of said second member, two of said other walls of each of said members having aligned semi-circular bosses adapted to slidably receive axially spaced areas of said rod, means biasing said washers on each side of said fulcrum toward said fulcrum independently of said housing members, and a plurality of slots and detents formed in said first and second members with each said detent positioned to engage a corresponding slot in the other member to secure said first and second members together with the inner peripheral edge of said first member abutting the inner peripheral edge of the second member to enclose said locking mechanism with said rod projecting through axially aligned circular apertures provided by said semi-circular bosses on said other walls and said mounting apertures supporting said housing on said fulcrum whereby the forces developed interiorly of the locking mechanism are transmitted by said fulcrum to said seat independently of said housing.

* * * * *